Sept. 9, 1947. R. D. WELLS Re. 22,913

BLOCK WALL CONSTRUCTION

Original Filed March 8, 1941 2 Sheets-Sheet 1

Inventor

Robert D. Wells

By Reynolds & Beach

Attorney

Sept. 9, 1947. R. D. WELLS Re. 22,913

BLOCK WALL CONSTRUCTION

Original Filed March 8, 1941 2 Sheets-Sheet 2

Inventor

Robert D. Wells

By Reynolds & Beach

Attorney

Reissued Sept. 9, 1947 Re. 22,913

UNITED STATES PATENT OFFICE 22,913

BLOCK WALL CONSTRUCTION

Robert D. Wells, Seattle, Wash., assignor to The Wells Company, Inc., Seattle, Wash., a corporation of Washington Original No. 2,371,201, dated March 13, 1945, Serial No. 382,349, March 8, 1941. Application for reissue November 13, 1945, Serial No. 628,347

7 Claims. (Cl. 72—38)

My invention relates to a block wall construction and a type of building element therefor. More particularly it concerns a wall structure composed of blocks, ordinarily of concrete or ceramic material, which need not be secured together by any bonding medium such as mortar. Such a wall construction therefore enables a considerable saving in material as well as in the time required for its fabrication. The substance of which the blocks are made may vary widely according to the requirements for the structure in which they are to be used. Various walls have been proposed heretofore, intended to have these advantages but they have largely been offset by the necessity of having a large number of different types and sizes of building unit or block, and the units themselves have been more expensive to manufacture than conventional blocks or bricks.

In fabricating my wall I employ building blocks all having the same general characteristics though blocks of several different lengths, varying in multiples of a definite increment, may be used. Such blocks may be arranged not only to construct a straight wall, but are adaptable for the fabrication of corners and partition junctions. Walls having two, three or four laterally spaced, parallel tiers may be built, and the spacing between such tiers may be varied according to the size and arrangement of the blocks. Moreover, additional bearing surface may be provided where needed, such as for carrying the ends of floor beams or roof trusses.

Although different plans may be used, my wall is preferably of the type incorporating two tiers arranged in spaced, parallel relationship to leave a dead air space therebetween for purposes of insulation, and capable of housing electric wires, water pipes, gas pipes, and the like. While leaving room for the inclusion of such installations within the walls I provide a cellular structure having, at intervals, transverse bulkheads interconnecting and bonding together the wall tiers. The individual blocks are provided with complemental, interlocking elements so that it is not necessary to use bonding material between them. Such elements are of symmetrical shape, however, so that the same type of unit may be used to construct the intertier bonds or bulkheads as for the wall tiers themselves.

Previous block wall constructions have presented a difficult problem, where a bulkhead or bridging block construction has been used between wall tiers, in not providing continuous spaces or corridors through the interior wall space generally, through the corners, and through the partitions. Necessary wires and pipes could therefore not be run in straight lines lengthwise within an outside wall or within a partition. Such difficulties are overcome by the arrangement of the blocks in the wall tiers and in the bonding bulkheads of my construction.

The complemental interlocking elements which hold the blocks of each wall tier together, and which tie the interconnecting bulkheads into each tier, are such that all the building units are of the same type, although they may be provided in several different lengths. Such elements preferably consist of projections or buttons spaced equally along the edge of a block, of a size and shape to fit into sockets in an adjacent block spaced correspondingly and shaped complementally. For the sake of maximum uniformity each block has projections on one edge and correspondingly positioned sockets on its opposite edge. In each case the end buttons and sockets should be spaced from the respective ends of the block a distance equal to half the spacing between adjacent buttons on the block measured between center lines. Moreover the thickness of each block should be equal to such spacing between the button center lines, or a whole multiple of such spacing. These buttons and sockets may be of any desired contour, but preferably are of the same extent lengthwise as transversely of the block, and of uniform shape, so that a button on one block will fit into a socket on any other block of the same or a different length, and whether such blocks be parallel or perpendicular to each other. The buttons may conveniently be of frusto-pyramidal or frusto-conical shape. Details of suitable block arrangements for constructing corners, partition junctions, and joist-carrying reinforcements will be described more fully hereafter.

As distinguished from previous walls, therefore, it will be evident that the purpose of my invention is to provide building units of uniform pattern which are of the interlocking type so that a wall may be constructed merely by laying them upon each other. The wall structures which may be built with such units may vary to a considerable extent, while nevertheless employing the same principles of construction. Basically such walls include inner and outer tiers with interconnecting bulkheads formed of the same type of unit used in making the wall tiers, yet which will have interlocking characteristics to eliminate the necessity of bonding material. Such units, although affording these advantages, are of simple design, and one which will not be likely to be damaged during handling. Prior to being used for wall construction, moreover, such blocks, although they are provided with interlocking elements, may be stacked readily despite variation in length, and may be removed from the stack just as readily. This characteristic enables my blocks to be used for temporary structures, if desired, so that a wall may be dismantled easily and without damage to the blocks.

The drawings illustrate different modifications of building block units and wall constructions exemplifying my invention as defined in the claims appended hereto.

Figure 1 is a top perspective view of one type of wall structure fabricated according to my invention, and showing corner and partition junction constructions, while

Figure 7 is a longitudinal section through a wall tier, illustrating how block buttons or projections interfit with sockets on an adjacent block, while

Figure 7:
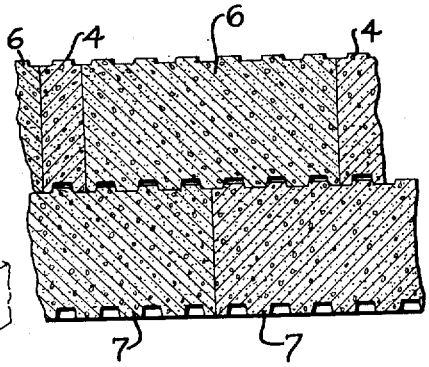
Figure 8:
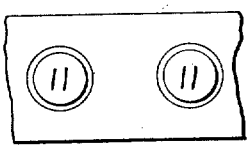
Figures 8 and 9 are plan views of two different types of projections or bottoms, a longitudinal section through both types of block appearing the same, as shown in Figure 7.
Figure 9:
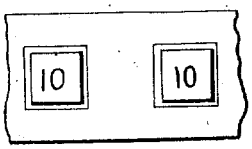

As has been stated, to obtain maximum uniformity of type, each building block or unit preferably has projections on one edge and complemental sockets located in corresponding positions in its opposite edge, as shown in Figures 7, 8, and 9. The most desirable shape for such projections is that of a truncated right pyramid, which, as shown in Figure 9 at 10, may be square, although any other equilateral pyramid having a multiple of four sides would be satisfactory. Alternatively, such buttons may be circular, in the form of truncated right cones 11, as in Figure 8. Such frusto-conical projections are considered to be not as desirable as the square type, for the latter tends to maintain the interfitted blocks in either precisely parallel or precisely perpendicular relationship, depending upon their relative disposition at the time the projection and sockets are fitted together.

The height and lateral extent, as well as the spacing of such buttons, is largely a matter of choice, but I have found that where a block 6 inches high is used satisfactory results can be obtained if the buttons are 1 inch in width at the base and ¼ inch in height, the sockets being slightly deeper so that face to face engagement of the blocks will never be prevented by the top of a button abutting the bottom of a socket. A wall construction such as illustrated may be satisfactorily produced from blocks having a thickness of 2 inches. If the bottoms are located along the median line of the block, therefore, they should be spaced 2 inches apart from center line to center line, with the center line of the end buttons located half that distance, that is, 1 inch from the adjacent block ends. The complemental sockets, of course, will be spaced the same distance apart, and preferably will be arranged in positions corresponding to the buttons, so that each will lie directly through the blocks from a button. Blocks having such proportions are shown in Figures 7, 8, and 9. Unit 1 has been illustrated as having one button, so that with these dimensions this block would be 2 inches square; blocks 2, having two buttons, would therefore be 4 inches long; blocks, 4 with four buttons would be 8 inches long; blocks 6 would be 12 inches long; and blocks 7 would be 14 inches long.

The thickness of all these blocks is the same, and, as stated previously, bears a definite relationship to the spacing of the buttons, in the blocks described such spacing being equal to the block thickness. Thus if the blocks are made 2 inches thick the thickness of one block plus the length of a 12-inch block 6 would equal the length of a 14-inch block 7, as shown in the drawings. It will be seen, therefore, that the thickness of the blocks at their ends is the primary consideration, but ordinarily their thickness would be uniform throughout. Where such large blocks as 6 and 7 are used a smaller block, such as the unit 4, 8 inches in length if the suggested measurements are followed, is provided, to be used as a cross or tie member in constructing the bridging or bonding bulkheads interconnecting the side tiers of the wall, without the thickness of the wall from face to face being excessive. Where such units are used in the arrangements shown, and which will be described hereafter, the total wall thickness will be 12 inches, which is ordinarily sufficient. The unit 2, shown to be 4 inches in length, is desirable for use in corner constructions and for fabrication of a wall of the type illustrated in Figures 4, 5, and 6. The smallest size of unit 1 is used as a filler in the wall.

Despite the provision of a number of units of different size, varying by whole multiples of an increment, here chosen as 2 inches, manufacture of the blocks is simplified, for they are all of equal and uniform width and height and have the same button and socket pattern, and vary only as to length. Thus one mold type can be provided for casting every size of block, and the length of block to be formed can be established in each case by appropriate end plate location. Other dimensions and other sizes of units may, of course, be provided as desired, but only a few sizes are necessary for the preferred types of wall construction.

Figure 1:
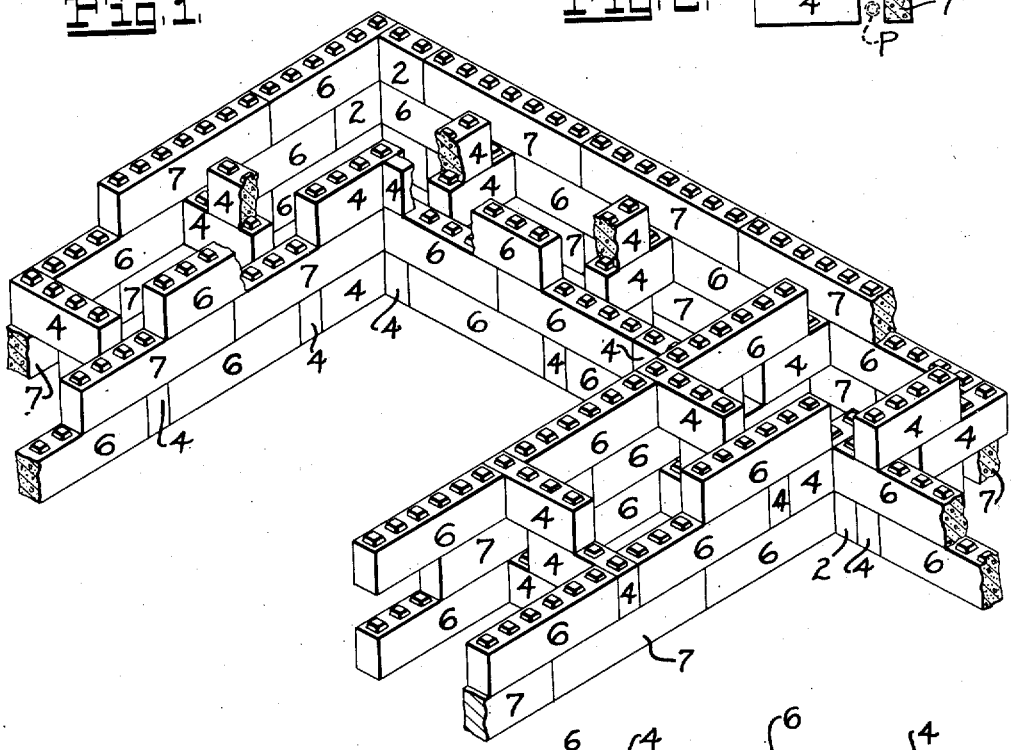

With building blocks of the type described various forms of wall construction are possible, but the two general types illustrated in the drawings I prefer at present. As shown at the left of Figure 1 a typical course in one of the side tiers of the wall is composed of a continuous row of blocks 7, each having seven buttons, whereas the alternate rows, with the exception of the corner construction, are composed of blocks 6, each having six buttons, disposed in staggered arrangement with respect to blocks 7, and separated from each other by the interposed ends of transverse bonding blocks 4 perpendicular to the wall tier, and extending toward the opposite wall tier. The outer wall tier follows the same pattern in having alternate courses composed of blocks 7 in end-abutting relationship, with the intermediate courses made up of blocks 6, separated by the ends of transverse blocks 4. It will be noted that because of the staggered relationship of transverse blocks 4, as shown best in Figure 2, the courses of the outer tier composed of blocks 7 will not be opposite the courses of the inner tier composed of blocks 7.

Figure 2:
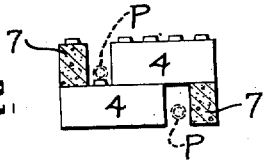
Figure 2 is a transverse section through a portion of such a wall.

The spacing between the inner faces of the inner and outer tiers is shown in Figures 1 and 2 to be equal to the length of blocks 4. Obviously such spacing, and hence the total wall thickness, may be increased or decreased by increments of 2 inches, while using the same type of wall construction, merely by selecting the appropriate length of transverse blocks. These blocks, when arranged as shown to form the interior bonds, do not span this space individually, for each has an end projecting into and through either the inner or the outer wall tier. Such embedded end of each block 4 is, of course, provided with a button and a socket, the former being received in a complemental socket in an adjacent block 7, and the socket of such block end receiving a button on the other adjacent block 7. The end of each block 4 will thus be positively connected to the tier courses both above and below it by interlocking elements. The positive interconnection or bonding of the two tiers is completed by the unembedded ends of the transverse blocks being mutually interlocked, by engagement of sockets and buttons, to hold the wall tiers in definitely spaced relationship.

Because one end of each block 4 is embedded within a wall tier, and the spacing between the tiers is equal to the length of a transverse block, there will be a space between the inner end of each transverse block and the adjacent tier equal to the thickness of a block. By the arrangement of the bulkheads shown in the drawings these spaces in any given wall are, for each course, all disposed in alignment to form continuous straight corridors extending lengthwise through the wall. Such corridors enable water pipes, gas pipes, and electrical conduits, indicated at P in Figure 2, to be run lengthwise through the wall, or through a partition, in a direct line. Because of the provision of such corridors it will be evident that such pipes need not be located in the wall as it is being erected, but may be inserted through these wall corridors afterward, if the wall corners and partition junctions are accessible for making up bends and branch connections. In order to enable such a pipe installation to be made the interior of the corners and partition junctions must also be unobstructed to enable a pipe to turn so that it may proceed through such a joining wall or partition.

In the wall shown in Figure 1 the partition, it will be noted, follows the same block pattern and is the same width as the wall proper. The width of the partition may be decreased if no corridors for the reception of pipes are required, either by merely moving the wall tiers closer together so that the inner end of each block 4 abuts the inner face of the adjacent tier, or by replacing blocks 4 with shorter units, or a partition like that shown in Figure 4 may be used in the construction of Figure 1. Such variations would require a slight rearrangement of the blocks at the junction of the partition with the wall. For such junctions and for the corner design blocks 2 are convenient for use as spacers, in the manner shown.

Figure 3:
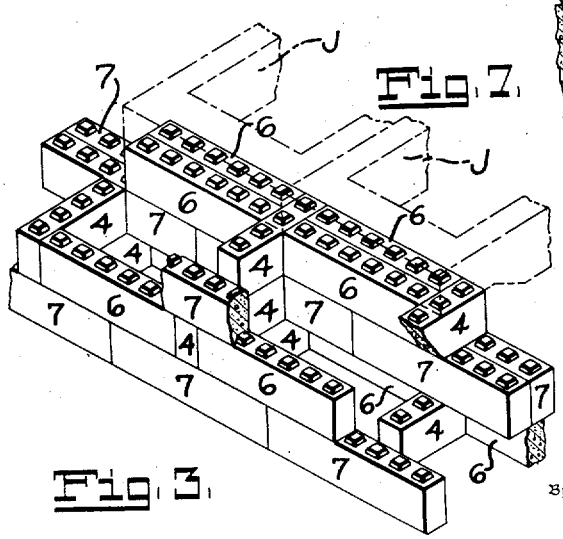
Figure 3 is a perspective view of a portion of a similar wall showing a reinforcement for supporting floor beams.

As has been pointed out, the wall tiers are preferably only 2 inches thick, but this is insufficient to afford proper bearing for floor joists J, which are shown in Figure 3. In order to furnish the additional bearing surface desired a double row of blocks 6 is provided, the extra row being supported by an extra under row of blocks 7 adjacent to the inner wall tier. These blocks 7 are centrally supported by the transverse blocks 4 beneath them each having an end embedded in the inner tier. Preferably the ends of each such block 7 abuts the ends of blocks similarly positioned, which will tend to prevent rocking of the blocks on their center bearings, so that a continuous row of blocks occupying a wall corridor is provided to act as a foundation for the extra row of bearing blocks 6 above. The inner ends of the transverse blocks 4 of the course at the level of the extra row of blocks 7, each having one end embedded in the outer tier, will abut the sides of these blocks 7. Between the transverse blocks 4 in the next higher course then will be positioned the extra row of bearing blocks 6, which will rest on the overhanging ends of the extra row of blocks 7, just described. A double row of blocks 6 may thus be formed completely around the wall, if desired, which will give a bearing width of four inches instead of two inches for the ends of joists J.

Such joists may be preformed box units, each of a width which may be equal to the length of a block 7, although this is not necessary. The height of the ends of the joist structure should be equal to the height of a block, however, and preferably provided with sockets for reception of the buttons on the blocks 6. In any event the height of the joist member end portion should be such that its upper surface will be coextensive with the upper face of a course of blocks, so that the next course may rest upon these joist ends which replace corresponding blocks of the inner wall tier. To support roof trusses the blocks may be doubled in a similar manner adjacent the outer tier.

Figure 4:
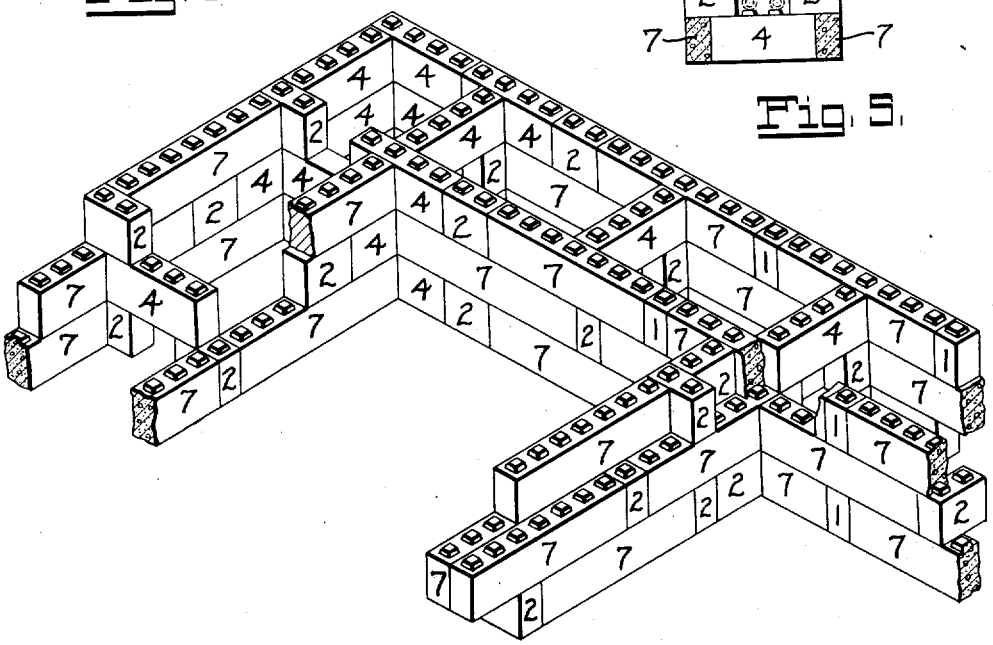
Figure 4 is a top perspective view of a portion of a modified form of wall structure which may be constructed with my block units.
Figure 5:
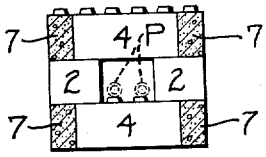
Figure 5 is a transverse section through a portion of such wall.
Figure 6:
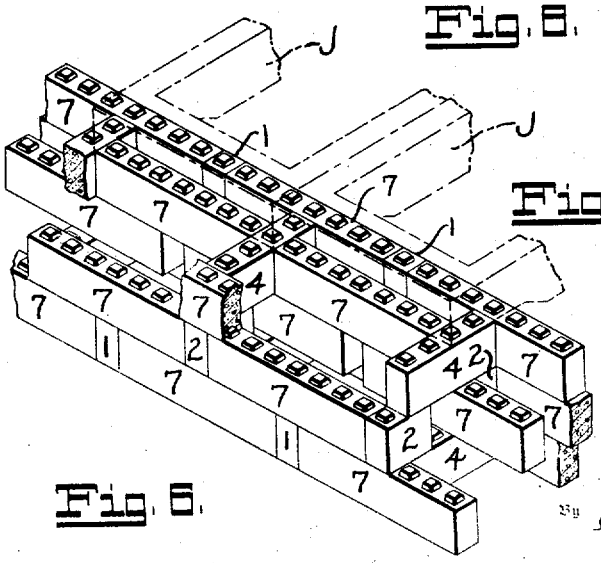
Figure 6 is a top perspective view of a portion of a wall like that shown in Figure 4, illustrating a reinforcement for carrying floor beams.

If larger corridors through the wall are desired the wall construction shown in Figures 4, 5, and 6 may be used. In this case also, instead of placing two different lengths of blocks in the wall faces in alternate courses, the same length block 7 is used, and where transverse blocks are not embedded between them they are spaced by square blocks 1. The same expedient might be used in the wall of Figure 1, if desired, replacing blocks 7 with units 6 and 1 in each case, or, if spacers 1 are used between the ends of blocks 7 shown, units 7 would replace units 6 between the ends of transverse blocks 4. The thickness of the wall between its opposite faces is the same as in the form of Figure 1.

In forming the intertier bulkheads blocks 2 are positioned transversely of the tiers, directly opposite each other, each having one end embedded in a tier and the other projecting into the interior wall space. Because the spacing between the inner faces of the wall tiers is again equal to the length of a block 4 the inner ends of such blocks 2 will be spaced apart a distance equal to the length of a block 2. Upon these inwardly projecting ends is supported, entirely between but abutting the wall tiers, a block 4 which, because of the interengagement of the buttons and sockets on the superposed blocks, will tie together the ends of the blocks 2 in the courses above and below it. Each bulkhead, therefore, is composed of alternate blocks 4 fitted between the walls, and intermediate pairs of blocks 2 spaced apart to form apertures through the bulkhead. Successive bulkheads will be constructed, as shown in Figure 4, so that the central apertures will be aligned to provide straight corridors through the wall. These corridors will be twice as wide as those shown in the wall structure of Figure 1, but they will be located only in every second course of the bulkheads.

Figures 2 and 5, showing the two types of wall in section, indicate the cross-sectional area of the corridors available for housing pipes. In broken lines in these figures are indicated pipes P, which may be threaded through the bulkhead apertures forming the corridors, and may rest directly upon and be supported by the transverse blocks forming the bottoms of such apertures. It will be evident that longer building elements for the same wall thickness may be employed to eliminate apertures through the bulkheads except where it is desired to install pipes or the like. On the other hand, a narrow wall may be constructed, and when it is desired to leave apertures aligned to constitute corridors, it will be only necessary to use shorter building units in such corresponding locations in all the bulkheads. Such modified constructions following the same principles will be evident to those familiar with the typical constructions disclosed herein.

In Figure 4 is shown a type of partition construction and junction different from that used in Figure 1, although the partition in some or all instances may instead be similar to the main wall construction. Considerable space is saved by using the type of partition shown, but it will be evident that pipes cannot be accommodated in such a partition, for it is of solid construction. In this partition the wall tiers are in face-to-face contact, and are directly interconnected by blocks 2. The appearance of the partition's face is the same as that of a wall face, since in each course the blocks 1 are spaced by the end of a block 2, and the blocks 1 in superposed courses are in staggered relationship.

Figure 6 shows the type of construction which may be employed for supporting floor joists, so that they will rest on a sufficiently wide bearing. Because in this type of construction apertures adjoining the inner wall tier are not available, blocks 1 are supported centrally on blocks 4 in position adjacent to but spaced from the inner wall tier, so that the inner ends of blocks 2 embedded in the inner tier will abut the sides of such blocks 1. Because of the interposition of the ends of blocks 2 in the corresponding course the adjacent ends of the blocks of such a row will be spaced apart by the width of a block, as shown, which blocks will be prevented from tipping, however, because, as in Figure 3, they are anchored at top and bottom by socket and button interengagement with blocks 4 above and below them. Of course if a longer unit were used for such under row of extra blocks they could mutually abut though supported at their centers.

This lower row of inner blocks 1 will then serve to support above them the extra bearing row of blocks 1, which latter blocks are interposed between transverse blocks 4. The ends of the floor joist units J will then span this upper extra row of blocks 1 and the adjacent wall tier. It will be evident that the adjacent ends of transverse blocks 4 will also aid in supporting the joists. The same width of bearing will thus be afforded by this construction as by that shown in Figure 3, although the bearing zones will be spaced apart a distance equal to the thickness of one block. The same type of preformed joist as previously described may be used, the end of which is preferably the same height as that of a block, to occupy one course of the tier. Similarly if roof trusses are to be supported the additional row of bearing blocks will be placed adjacent to the outer wall tier instead of the inner tier, since such trusses are supported from the outer edge of the wall.

The corner constructions and partition junctions have not been described in detail, for various arrangements of blocks may be used depending upon where such corners and junctions come in the wall. A typical satisfactory arrangement is shown clearly in the drawings for each type of construction. The principal features of importance are the arrangement of the type of block shown for making different styles of wall proper, for different partition requirements, and for providing adequate bearing support for floor joists and roof trusses, as has been described, all by the use of a few sizes of blocks of the same pattern. For the wall of Figure 1 only four sizes of blocks are required, namely, blocks 2, 4, 6 and 7, while for that of Figure 4 only four sizes are required namely, blocks 1, 2, 4 and 7. The number of block sizes needed may be reduced even farther for walls of certain dimensions, or for walls which do not require uniformity and symmetry of appearance in the exposed wall faces.

I claim as my invention:

1. A wall structure composed of building blocks defining an outer and an inner tier disposed in spaced, parallel relationship, bulkheads interconnecting said outer and inner tiers, adjacent bulkheads being correspondingly apertured to define a straight corridor extending lengthwise through the wall, means extending lengthwise through such corridor and supported from the bulkheads, and members within the wall interposed between adjacent bulkheads and supported from said means constituting a bearing member for a structure supported by the wall.

2. A wall structure composed of building blocks defining an outer and an inner tier disposed in spaced, parallel relationship, bulkheads interconnecting said outer and inner tiers composed of superposed courses of building blocks, and correspondingly apertured to define straight corridors extending through the bulkheads, supporting members received one in each bulkhead aperture of such a corridor and centrally supported by such bulkhead, and members interposed between said bulkheads and supported by and spanning adjacent ends of said first members, and constituting bearings for a structure supported by the wall.

3. A wall structure composed of layers of building blocks defining two tiers disposed in spaced, parallel relationship, and bulkheads interconnecting said tiers, all the blocks incorporated in both of said tiers and in said bulkheads being of the same thickness and each block having projections along one edge equally spaced apart distances substantially equal to the block's thickness, and complemental sockets in corresponding positions in its opposite edge, such projections and sockets being shaped so that a projection and a socket of superposed blocks will interfit whether such blocks be arranged in parallel or mutually perpendicular relationship, all the bulkhead blocks in a given layer of the wall structure having corresponding ends embedded in the same layer of one tier and having their opposite corresponding ends all spaced from the same layer of the other tier to define a linear corridor extending uninterruptedly lengthwise through the wall space alongside the latter tier, the adjacent bulkhead block ends in said given layer being spaced apart by one tier block in the same layer, each such tier block abutting such ends, having an even number of projections and sockets, and being of a length at least as great as the length of said bulkhead blocks, each such tier block in said given layer of the other tier, which defines such corridor, having one more projection and socket than those tier blocks in the same layer of said first tier which abut the embedded ends of the bulkhead blocks in such given layer, and being of a length equal to the length of the latter tier block plus the thickness of a bulkhead block, each of the tier blocks in the tier layers adjoining said given layer of said first-named tier having an odd number of projections and sockets, and being equal in length to the block in said given layer of the other tier, the terminal projection and socket of the tier-embedded end of each bulkhead block being engaged, respectively, with the socket and projection midway between the ends of the tier blocks in the adjoining tier layers, and a projection and a socket of the other end of each bulkhead block engaging, respectively, a socket and a projection of bulkhead blocks in the adjoining layers.

4. A wall structure composed of layers of building blocks defining two tiers disposed in spaced, parallel relationship, and bulkheads interconnecting said tiers, all blocks incorporated in both of said tiers and in said bulkheads being of the same thickness and each block having projections along one edge equally spaced apart distances substantially equal to the block's thickness, and complemental sockets in corresponding positions in its opposite edge, such projections and sockets being shaped so that a projection and a socket of superposed blocks will interfit whether such blocks be arranged in parallel or mutually perpendicular relationship, all the bulkhead blocks in a given layer of the wall structure having corresponding ends embedded in the same layer of one tier and having their opposite corresponding ends all spaced from the same layer of the other tier to define a linear corridor extending uninterruptedly lengthwise through the wall space alongside the latter tier, those tier blocks which lie in the same layer with, and abut each bulkhead block, the end whereof is embedded in that layer, having an even number of projections and sockets, and being of a length at least as great as the length of such bulkhead block, and those tier blocks in layers which contain no bulkhead blocks being each of a length greater than such bulkhead block and such first named tier blocks, and having an odd number of sockets and projections, the terminal projection and socket of the tier-embedded end of each bulkhead block being engaged, respectively, with the socket and projection midway between the ends of the tier blocks in the adjoining tier layers, and a projection and a socket of the other end of each bulkhead block engaging, respectively, a socket and a projection of the bulkhead blocks in the adjoining layers.

5. A wall structure composed of layers of building blocks defining two tiers disposed in spaced, parallel relationship, and bulkheads interconnecting said tiers, each of the blocks constituting both of said tiers and said bulkheads having projections equally spaced along one horizontal edge and complemental sockets similarly spaced along its opposite horizontal edge, such projections and sockets being so shaped that a projection and a socket of superposed blocks will interfit whether such blocks be arranged in parallel or mutually perpendicular relationship, each bulkhead block having one end embedded in one tier, interposed between and abutting tier blocks in a given layer, said abutting tier blocks each having equal, even numbers of projections, and such bulkhead block end having a projection and a socket engaged, respectively, with a socket and a projection midway between the ends of tier blocks in the adjoining layers of said tier, said latter tier blocks each having equal, odd numbers of projections and sockets, the odd number whereof exceeds by one only the even numbers of sockets and projections on said tier blocks in said given layer, wherein the end of the bulkhead block is embedded, and the other end of each bulkhead block being incorporated in the bulkhead and having a projection and a socket engaged, respectively, with a socket and a projection of bulkhead blocks in the adjoining layers.

6. A wall structure composed of building blocks laid up in common layers in a first and a spaced, parallel second tier, respectively, bulkhead blocks spaced longitudinally of the wall in alternate layers in the second tier being disposed perpendicularly to such tier, directed towards the first tier, and a like number of bulkhead blocks, in vertical planes common to the first bulkhead blocks but in the intervening layers of the first tier, being similarly disposed but directed towards the second tier, all bulkhead blocks in a common plane being relatively of such length as to overlap one another, to define bulkheads interconnecting the first and second tiers, the bulkhead blocks in certain layers stopping short of the opposite tier to define straight corridors extending lengthwise through the wall, a plurality of blocks in end-abutting relationship extending lengthwise through one such corridor, and further blocks staggered relative to and supported upon such last-named blocks, in end-abutting relationship to the bulkhead blocks of the course above said last-named block.

7. A wall structure composed of building blocks laid up in common layers in a first tier and in a spaced, parallel second tier, respectively, bulkhead blocks spaced longitudinally of the wall in alternate layers in one such tier being disposed perpendicularly to its tier, directed towards but stopping short of the opposite tier, transverse intertier blocks extending from such opposite tier inwardly, to overlap the adjacent ends of said bulkhead blocks, and to constitute with the latter blocks bulkheads interconnecting the two tiers, and to define straight corridors extending lengthwise within the wall, a plurality of blocks disposed in alignment within one such corridor, each resting at its mid-point upon a transverse intertier block, and a further plurality of similar blocks staggered relative to and supported upon the last-named blocks, in end-abutting relationship to the transverse intertier blocks in the layer above the last-named blocks.

ROBERT D. WELLS.

REFERENCES CITED

The following references are of record in the file of this patent:

UNITED STATES PATENTS

| Number | Name | Date |
|---|---|---|
| 534,462 | Balsley | Feb. 19, 1895 |
| 711,541 | Standau | Oct. 21, 1902 |
| 815,097 | Klay | Mar. 13, 1906 |
| 954,690 | Pettigrew | Apr. 12, 1910 |
| 1,298,026 | Ferguson | Mar. 25, 1919 |
| 1,565,537 | Wells | Dec. 15, 1925 |
| 1,543,331 | Hoenemann | June 23, 1925 |
| 1,582,170 | Fellows | Apr. 23, 1926 |
| 2,157,992 | Smith | May 9, 1939 |
| 2,176,986 | Briscoe | Oct. 24, 1939 |

FOREIGN PATENTS

| Number | Country | Date |
|---|---|---|
| 68,013 | Switzerland | Feb. 1, 1915 |
| 81,233 | Austria | Sept. 10, 1920 |